US008470063B1

(12) United States Patent
Erazo Ortega

(10) Patent No.: US 8,470,063 B1
(45) Date of Patent: Jun. 25, 2013

(54) CHIMNEY FILTER SYSTEM

(76) Inventor: Hector Fernando Erazo Ortega, Limache (CL)

( * ) Notice: Subject to any disclaimer, the term of this patent is extended or adjusted under 35 U.S.C. 154(b) by 272 days.

(21) Appl. No.: 13/031,433

(22) Filed: Feb. 21, 2011

(51) Int. Cl.
*B01D 45/00* (2006.01)

(52) U.S. Cl.
USPC ............ 55/423; 55/428; 55/467; 95/149; 95/197; 95/273; 95/282; 95/205; 96/236; 96/237; 96/294; 96/322

(58) Field of Classification Search
USPC ............ 55/423, 467, DIG. 34, 428; 95/273, 95/282, 149, 197, 205; 210/67–68, 75, 93; 96/236–237, 294, 322; 454/1, 3, 4
See application file for complete search history.

(56) References Cited

U.S. PATENT DOCUMENTS

| 3,706,182 | A | 12/1972 | Sargent |
| 3,716,867 | A | 2/1973 | Mayes et al. |
| 3,732,075 | A | 5/1973 | Acaba |
| 3,799,604 | A | 3/1974 | Letourneux |
| 3,957,636 | A * | 5/1976 | Arvanitakis ............ 210/739 |
| 4,286,975 | A | 9/1981 | Whiteley |
| 5,395,408 | A | 3/1995 | Zeritis |
| 5,738,706 | A * | 4/1998 | Swanander et al. ........ 95/14 |
| 6,808,544 | B1 | 10/2004 | Rodriguez |
| 2004/0118280 | A1 | 6/2004 | Tinguee, Jr. |

* cited by examiner

*Primary Examiner* — Robert Clemente
*Assistant Examiner* — Karla Hawkins

(57) ABSTRACT

A chimney filter system featuring two or more filter housings mounted atop an industrial chimney stack and a reservoir fluidly connected to the lower filter housing via a first drain pipe that allows water to flow from the lower filter housing to the reservoir. The reservoir allows contaminants in the water to collect on the bottom surface of the reservoir. A second drain pipe is fluidly connected to the reservoir via a pump. The pump and second drain pipe deliver water from the reservoir to the upper filter housing.

5 Claims, 5 Drawing Sheets

CHIMNEY FILTER SYSTEM

FIELD OF THE INVENTION

The present invention is directed to a filtering system for a chimney, more particularly to a filtering system that doesn't require an extractor or air compressor.

BACKGROUND OF THE INVENTION

Drainage of condensed corrosive fluids can occur inside a chimney. The present invention features a chimney filter system for protecting against corrosive fluid drainage. The chimney filter system helps eliminate the pollution caused by industrial chemicals and doesn't need extractors or air compressors to direct emissions like many of the systems being used currently. The system of the present invention allows for more direct and faster filtering with less evaporation (and with minimum contrary water stream).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a chimney filter system. In some embodiments, the system comprises a first filter housing adapted to be atop an industrial chimney stack, and a third filter housing disposed atop the first filter housing, the filter housings allowing for gas flow from the chimney stack through the filter housings, each filter housing having a top and a bottom; a lower reservoir fluidly connected to the first filter housing via a first drain pipe, the first drain pipe allows water from the first filter housing to drain into the lower reservoir, the lower reservoir functions to allow contaminants in the water to collect on a bottom surface; a second drain pipe fluidly connected to lower reservoir via a pump, the pump functions to pump water from the lower reservoir into the third filter housing; and a third drain pipe is fluidly connected to the lower reservoir, the third drain pipe functions to allow the contaminants collected at the bottom surface of the lower reservoir to be drained. A filter cover is disposed in each filter housing at the bottom, a filter is disposed in the filter cover, and a soaking cone is disposed in the filter. The second drain pipe is fluidly connected to a sprayer system disposed at the top of the third filter housing above the soaking cone. The sprayer system functions to spray the water pumped from the reservoir via the pump into the top of the third filter housing. The water drains from the third filter housing to the first filter housing and further back to the lower reservoir via the first drain pipe.

In some embodiments, the system further comprises a second filter housing 110b disposed between the first filter housing and the third filter housing. In some embodiments, the system further comprises more than three filter housings. In some embodiments, the filter housings are generally cylindrical. In some embodiments, the lower reservoir is divided into a first half reservoir and second half reservoir, the first half reservoir being fluidly connected to the second half reservoir via a connection pipe.

DESCRIPTION OF PREFERRED EMBODIMENTS

Referring now to FIGS. 1-6, the present invention features a chimney filter system 100 for protecting against corrosive fluid drainage. The chimney filter system 100 helps eliminate the pollution caused by industrial chemicals and doesn't need extractors or aft compressors to direct emissions like many of the systems being used currently. The system 100 of the present invention allows for more direct and faster filtering with less evaporation (and with minimum contrary water stream).

Figure 1:
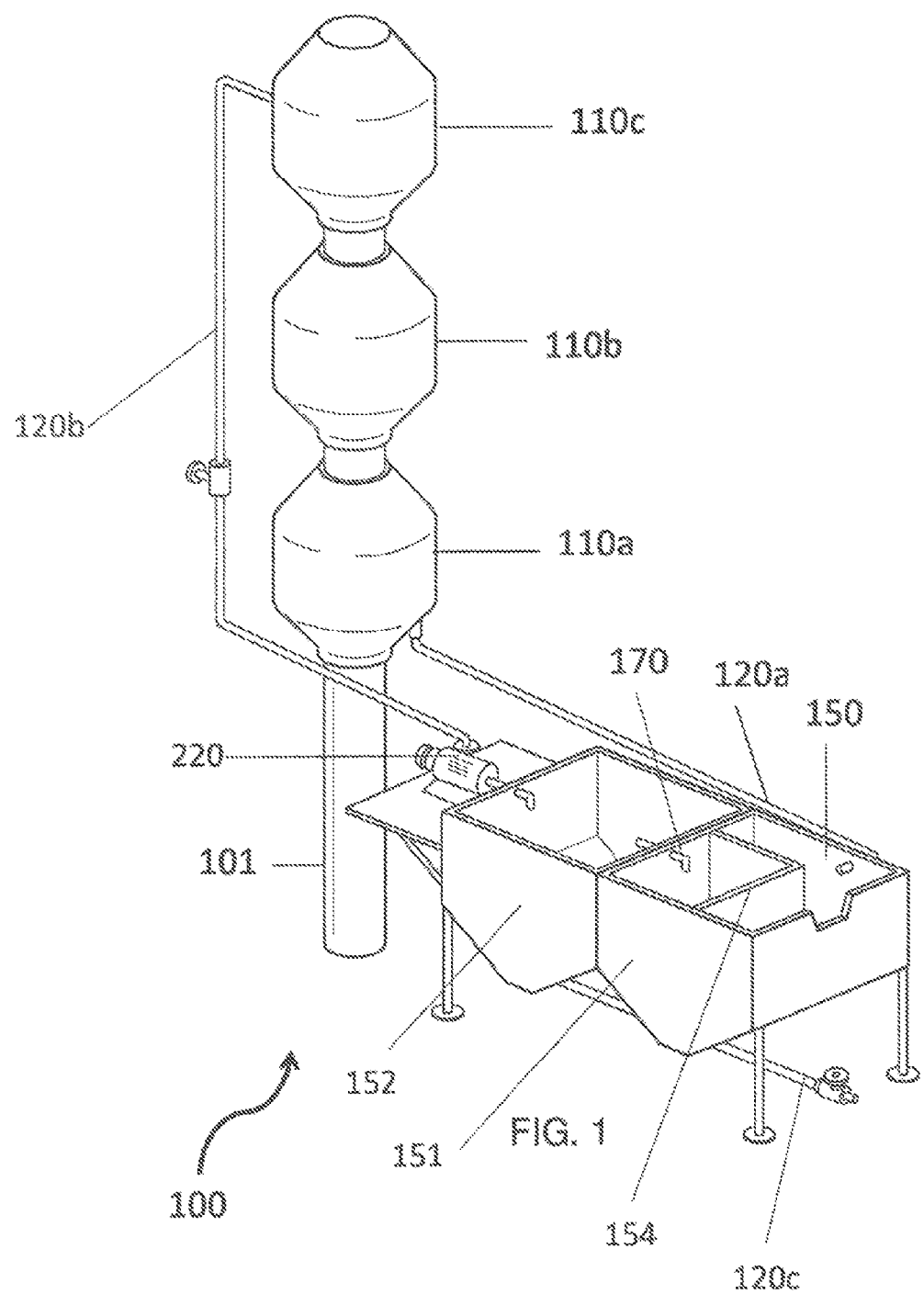
FIG. 1 is a perspective view of the chimney filter system of the present invention.
Figure 2:
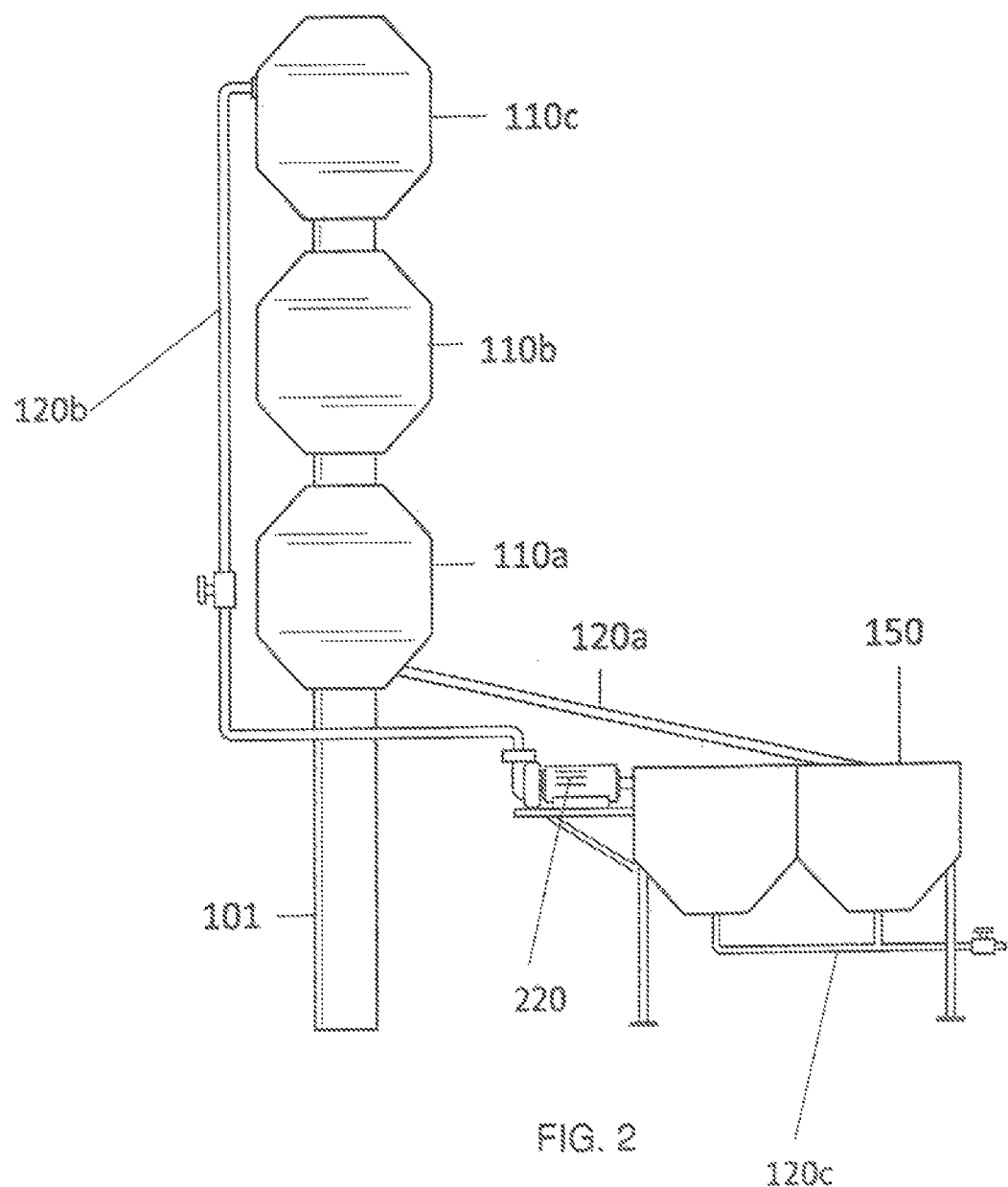
FIG. 2 is a side view of the chimney filter system of FIG. 1.
Figure 3:
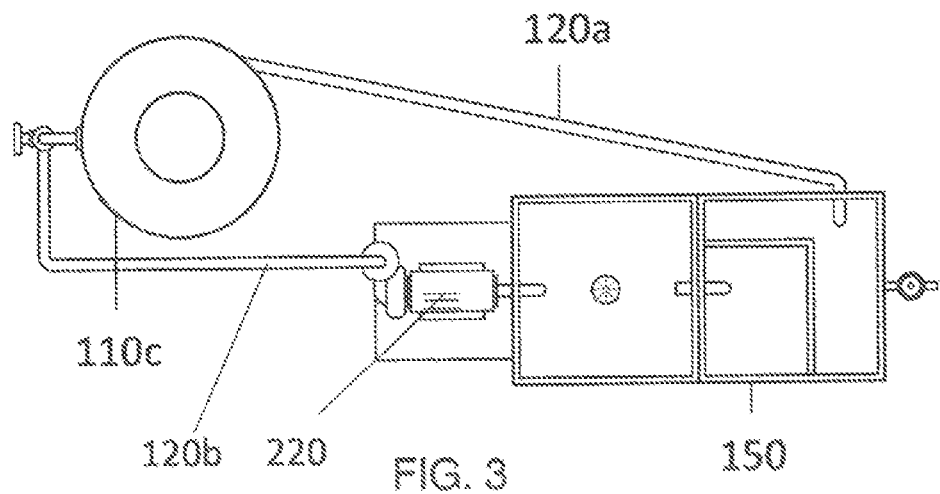
FIG. 3 is a top view of the chimney filter system of FIG. 1.

The system 100 of the present invention comprises a first filter housing 110a adapted to mount atop an industrial chimney stack 101 (e.g., see FIG. 1). In some embodiments, a second filter housing 110b is disposed atop the first filter housing 110b. In some embodiments, a third filter housing 110c is disposed atop the second filter 110c. In some embodiments, the system 100 comprises more than three filter housings (e.g., four, five, six, etc.). The filters 110 may be generally cylindrical, however the filter housings 110 are not limited to this shape. The filter housings 110 may be constructed in a variety of sizes. For example, in some embodiments, the filter housings 110 are about 12 inches in height and/or about 24 inches in length and/or 10 inches in diameter. The present invention is not limited to the aforementioned dimensions. The diameters of the filter housings 110 generally are larger than that of the industrial chimney stack 101. The filter housings 110 allow gases to flow from the chimney 101 through the bottom 112 of the filter housing 110 and through the top 111 of the filter housing 110.

The device 100 of the present invention further comprises a lower reservoir 150. The lower reservoir 150 is fluidly connected to the first filter housing 110a via a first drain pipe 120a. The first drain pipe 120a allows fluid from the first filter housing 110a to drain into the lower reservoir 150. The lower reservoir 150 allows for retention of contaminants. For example, gravity pulls the contaminants (sediments) to the bottom of the reservoir, and the water (without contaminants) remains atop the contaminants. The water can be re-used, for example the water can be pumped back into the filter housings 110a via a pump 220 and a second drain pipe 120b. In some embodiments, the second drain pipe 120b fluidly connects the lower reservoir 150 to the first filter housing 110a. In some embodiments, the second drain pipe 120b fluidly connects the lower reservoir 150 to the second filter housing 110b. In some embodiments, the second drain pipe 120b fluidly connects the lower reservoir 150 to the third filter housing 110c. The second drain pipe 120b generally fluidly connects the lower reservoir 150 to the top-most filter housing 110c (e.g., see FIG. 1).

In some embodiments, the lower reservoir 150 is divided into a first half reservoir 151 and second half reservoir 152, the first half reservoir 151 being fluidly connected to the second half reservoir 152 via a connection pipe 170. The second half reservoir 152 may function to supply dean water through the drain pipe 120b. A sectional wall 154 may be disposed in the first half reservoir. The sectional wall 154 may function to separate the rust that came from the emissions/soot via the drain pipe 120a.

In some embodiments, a third drain pipe 120c is fluidly connected to the lower reservoir 150 (e.g., either the first half reservoir, the second half reservoir, or both half reservoirs). The third drain pipe 120c functions to remove the contaminants (sediments) that collect at the bottom surface of the lower reservoir 150.

Disposed in each filter housing 110 is a filter cover 310, which is positioned near the bottom 112 of the filter housing 110. The bottom 112 of the filter housing 110 functions as a water recipient. Disposed inside the filter cover 310 is a filter 320 (e.g., mesh filter). Disposed inside the filter 320 is a soaking cone 330. The soaking cone 330 generally splits the soot emissions into the filter cover 310. The filter cover 310 keeps inside the soaking cone 330 and the filter 320 (e.g., mesh filter). The filter cover protects the filter 320 and soaking cone 330 and functions as a body for the filter.

Figure 4:
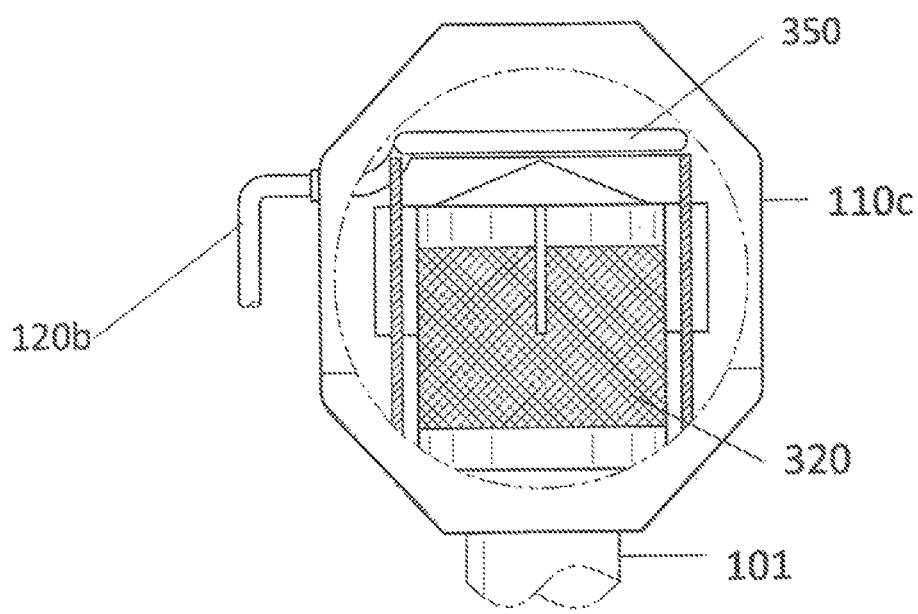
FIG. 4 is a detailed view of the chimney filter system of the present invention.
Figure 5:
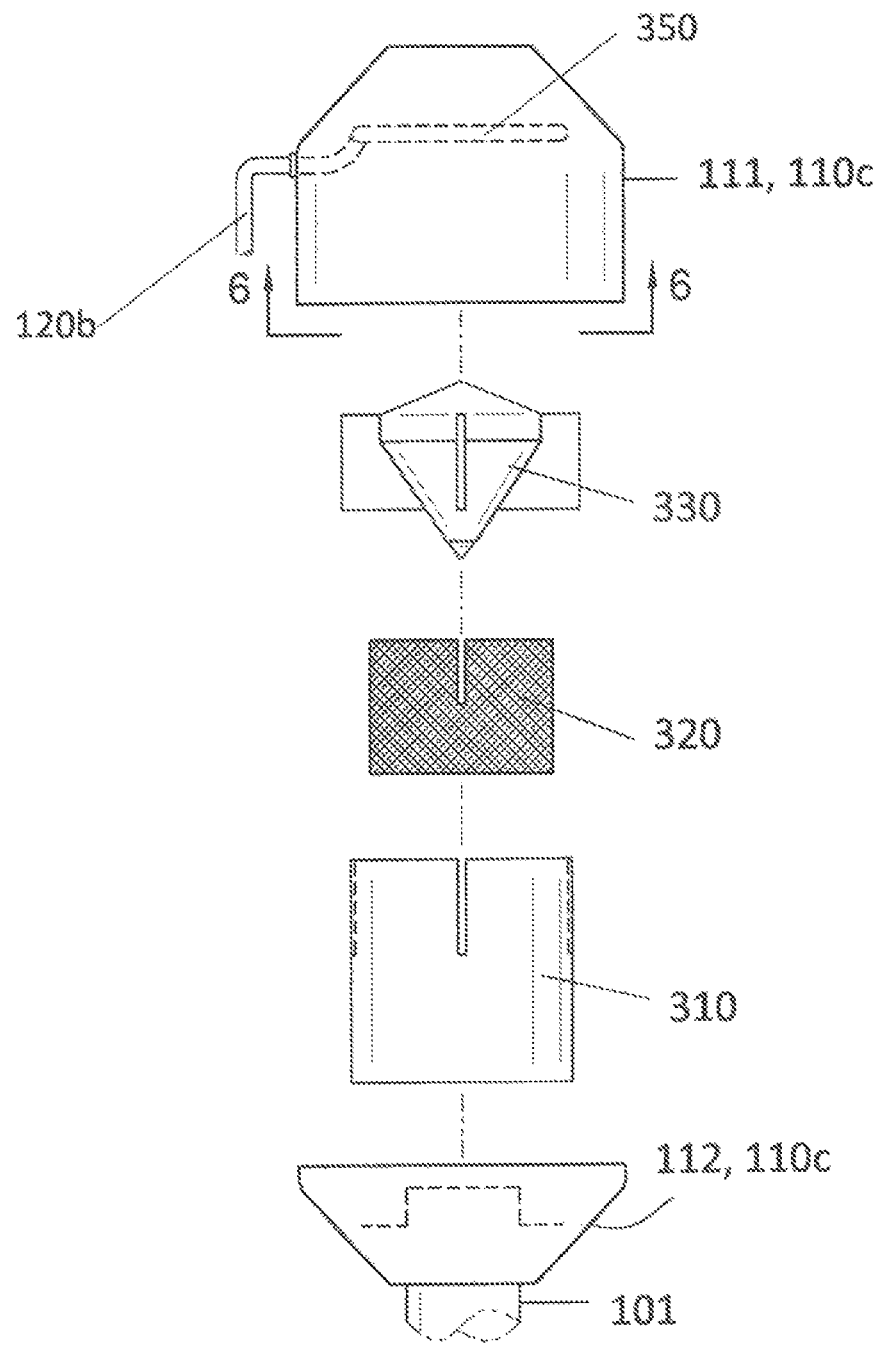
FIG. 5 is an exploded view of the chimney filter system of the present invention.
Figure 6:
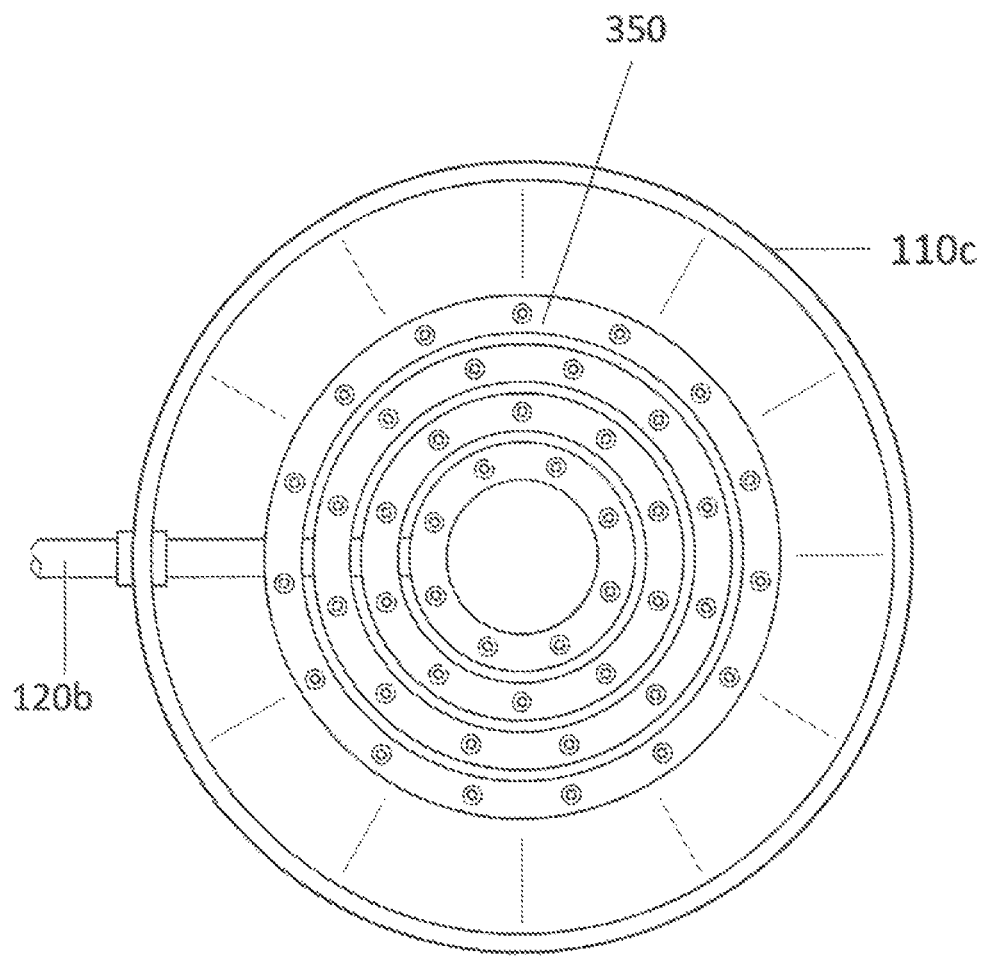
FIG. 6 is a bottom cross sectional view of the chimney filter system of FIG. 5.

As shown in FIG. 4 and FIG. 5, the second drain pipe 120b is fluidly connected to a sprayer system 350 disposed at the top 111 of the filter housing 110 (above the soaking cone 330), for example the third filter housing 110c. The sprayer system 350 functions to spray the water pumped from the reservoir 150 (via the pump 220) and into the top 111 of the filter housing 110 (e.g., third filter housing 110c). This can help scrub contaminants from the gasses flowing through the chimney 101 (and filter housings 110). Water can drain from the bottom 112 of the third filter housing 110c through the second filter housing 110b, through the first filter housing 110c, and then through the first drain pipe 120a to the reservoir 150.

The disclosures of the following U.S. Patents are incorporated in their entirety by reference herein: U.S. Pat. No. 3,799,604; U.S. Pat. Application No. 2004/0118280: U.S. Pat. No. 6,808,544; U.S. Pat. No. 3,706,182; U.S. Pat. No. 5,738,706; U.S. Pat. No. 5,395,408; U.S. Pat. No. 3,716,867; U.S. Pat. No. 3,732,075; U.S. Pat. No. 4,286,975.

Various modifications of the invention, in addition to those described herein, will be apparent to those skilled in the art from the foregoing description. Such modifications are also intended to fail within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A chimney filter system (100) comprising:
   (a) a first filter housing (110a) adapted to be mounted atop an industrial chimney stack (101), and a third filter housing (110c) disposed atop the first filter housing (110b), the filter housings (110) allowing for gas flow from the chimney stack (101) through the filter housings (110), each filter housing (110) having a top (111) and a bottom (112);
   (b) a lower reservoir (150) fluidly connected to the first filter housing (110a) via a first drain pipe (120a), the first drain pipe (120a) allows water from the first filter housing 110a to drain into the lower reservoir (150), the lower reservoir (150) functions to allow contaminants in the water to collect on a bottom surface, wherein the lower reservoir (150) is divided into a first half reservoir and second half reservoir, the first half reservoir being fluidly connected to the second half reservoir via a connection pipe (170), wherein a sectional wall (154) is disposed in the first half reservoir to separate the rust that came from the emissions/soot via the drain pipe (120a);
   (c) a second drain pipe (120b) fluidly connected to lower reservoir (150) via a pump (220), the pump (220) functions to pump water from the lower reservoir into the third filter housing (110c); and
   (d) a third drain pipe (120c) is fluidly connected to the lower reservoir (150), the third drain pipe (120c) functions to allow the contaminants collected at the bottom surface of the lower reservoir (150) to be drained;
   wherein a filter cover (310) is disposed in each filter housing (110) at the bottom (112) and a filter (320) is disposed in the filter cover (310) and a soaking cone (330) is disposed in the filter (320); wherein the second drain pipe (120b) is fluidly connected to a sprayer system (350) disposed at the top (111) of the third filter housing (110c) above the soaking cone (330), the sprayer system (350) functions to spray the water pumped from the reservoir (150 via the pump (220) into the top (111) of the third filter housing (110c); wherein the water drains from the third filter housing (110c) to the first filter housing (110a) and further back to the lower reservoir (150) via the first drain pipe (120a).

2. The system of claim 1 further comprising a second filter housing (110b), disposed between the first filter housing (110a) and the third filter housing (110c).

3. The system of claim 2 further comprising more than three filter housings.

4. The system of claim 1, wherein the filter housings (110) are generally cylindrical.

5. A chimney filter system (100) consisting of:
   (a) a first filter housing (110a) adapted to be mounted atop an industrial chimney stack (101), and a third filter housing (110c) disposed atop the first filter housing (110b), the filter housings (110) allowing for gas flow from the chimney stack (101) through the filter housings (110), each filter housing (110) having a top (111) and a bottom (112);
   (b) a lower reservoir (150) fluidly connected to the first filter housing (110a) via a first drain pipe (120a), the first drain pipe (120a) allows water from the first filter housing 110a to drain into the lower reservoir (150), the lower reservoir (150) functions to allow contaminants in the water to collect on a bottom surface, wherein the lower reservoir (150) is divided into a first half reservoir and second half reservoir, the first half reservoir being fluidly connected to the second half reservoir via a connection pipe (170), wherein a sectional wall (154) is disposed in the first half reservoir to separate the rust that came from the emissions/soot via the drain pipe (120a);
   (c) a second drain pipe (120b) fluidly connected to lower reservoir (150) via a pump (220), the pump (220) functions to pump water from the lower reservoir into the third filter housing (110c); and
   (d) a third drain pipe (120c) is fluidly connected to the tower reservoir (150), the third drain pipe (120c) functions to allow the contaminants collected at the bottom surface of the lower reservoir (150) to be drained;
   wherein a filter cover (310) is disposed in each filter housing (110) at the bottom (112) and a filter (320) is disposed in the filter cover (310) and a soaking cone (330) is disposed in the filter (320); wherein the second drain pipe (120*b*) is fluidly connected to a sprayer system (350) disposed at the top (111) of the third filter housing (110*c*) above the soaking cone (330), the sprayer system (350) functions to spray the water pumped from the reservoir (150 via the pump (220) into the top (111) of the third filter housing (110*c*); wherein the water drains from the third filter housing (110*c*) to the first filter housing (110*a*) and further back to the lower reservoir (150) via the first drain pipe (120*a*).

\* \* \* \* \*